United States Patent
Kamiya et al.

(10) Patent No.: US 12,280,762 B2
(45) Date of Patent: Apr. 22, 2025

(54) CONTROL DEVICE FOR VEHICLE, CONTROL METHOD FOR VEHICLE, AND NON-TRANSITORY STORAGE MEDIUM

(71) Applicants: TOYOTA JIDOSHA KABUSHIKI KAISHA, Toyota (JP); J-QuAD DYNAMICS Inc., Tokyo (JP); ADVICS CO., LTD., Kariya (JP)

(72) Inventors: Yusuke Kamiya, Toyota (JP); Kazuki Miyake, Okazaki (JP); Taketsugu Miyata, Toyota (JP); Tatsuya Hiromura, Tokyo-to (JP)

(73) Assignees: TOYOTA JIDOSHA KABUSHIKI KAISHA, Toyota (JP); J-QuAD DYNAMICS INC., Tokyo (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 18/738,848

(22) Filed: Jun. 10, 2024

(65) Prior Publication Data
US 2024/0416890 A1   Dec. 19, 2024

(30) Foreign Application Priority Data

Jun. 16, 2023 (JP) ................................. 2023-099317

(51) Int. Cl.
*B60W 50/00* (2006.01)
*B60W 10/06* (2006.01)
(Continued)

(52) U.S. Cl.
CPC .......... *B60W 10/06* (2013.01); *B60W 10/188* (2013.01); *B60W 30/18072* (2013.01);
(Continued)

(58) Field of Classification Search
CPC .............. B60W 10/06; B60W 10/188; B60W 30/18072; B60W 50/0097;
(Continued)

(56) References Cited

U.S. PATENT DOCUMENTS

| 9,533,669 | B2 * | 1/2017 | Kono | ...................... F16D 48/06 |
| 2005/0049111 | A1 * | 3/2005 | Takada | ................... F02D 41/023 477/107 |

(Continued)

FOREIGN PATENT DOCUMENTS

| JP | 2020-121678 A | 8/2020 |
| JP | 2020-180602 A | 11/2020 |

*Primary Examiner* — Justin Holmes
(74) *Attorney, Agent, or Firm* — Oliff PLC

(57) ABSTRACT

A control device for a vehicle includes one or more processors configured to: perform feedback control on an acceleration of the vehicle by controlling a driving force of an internal combustion engine mounted on the vehicle based on a difference between a requested acceleration of the vehicle from an application and an actual acceleration of the vehicle; calculate a first predicted acceleration that is a predicted acceleration of the vehicle on an assumption that the internal combustion engine is controlled into a fuel-cut state; and control the internal combustion engine into the fuel-cut state without performing the feedback control when a coasting condition that is predetermined is satisfied and the first predicted acceleration is equal to or higher than a lower limit value that is predetermined as a negative value.

8 Claims, 3 Drawing Sheets

(51) Int. Cl.
*B60W 10/188* (2012.01)
*B60W 30/18* (2012.01)
(52) U.S. Cl.
CPC . *B60W 50/0097* (2013.01); *B60W 2050/0008* (2013.01); *B60W 2510/0623* (2013.01); *B60W 2510/182* (2013.01); *B60W 2520/105* (2013.01)
(58) Field of Classification Search
CPC . B60W 2050/0008; B60W 2510/0623; B60W 2510/182; B60W 2520/105
See application file for complete search history.

(56) References Cited

U.S. PATENT DOCUMENTS

| | | | |
|---|---|---|---|
| 2019/0276026 A1* | 9/2019 | Shimizu | B60W 10/184 |
| 2020/0180630 A1* | 6/2020 | Kaneko | B60W 10/06 |
| 2020/0247410 A1 | 8/2020 | Nomura et al. | |
| 2020/0324774 A1* | 10/2020 | Sato | B60W 10/18 |
| 2020/0339122 A1 | 10/2020 | Kawanishi et al. | |

* cited by examiner

CONTROL DEVICE FOR VEHICLE, CONTROL METHOD FOR VEHICLE, AND NON-TRANSITORY STORAGE MEDIUM

CROSS-REFERENCE TO RELATED APPLICATION

This application claims priority to Japanese Patent Application No. 2023-099317 filed on Jun. 16, 2023, incorporated herein by reference in its entirety.

BACKGROUND

1. Technical Field

The present disclosure relates to a control device for a vehicle, a control method for a vehicle, and a non-transitory storage medium.

2. Description of Related Art

A vehicle disclosed in Japanese Unexamined Patent Application Publication No. 2020-180602 (JP 2020-180602 A) includes an internal combustion engine and a control device. The control device causes the vehicle to coast when both an accelerator pedal and a brake pedal are not operated while the vehicle is traveling. At this time, the control device generates a slightly negative driving force, that is, a slight braking force, for the internal combustion engine. Therefore, the coasting vehicle gradually decelerates.

SUMMARY

In the technology as in JP 2020-180602 A for causing the vehicle to coast, feedback control may be performed on the acceleration of the vehicle. In this case, the driving force of the internal combustion engine is adjusted to eliminate a difference between a requested acceleration of the vehicle and an actual acceleration of the vehicle. At this time, the requested driving force of the internal combustion engine may increase or decrease depending on an increase or decrease in the difference between the actual acceleration and the requested acceleration.

Operation states of the internal combustion engine include an idling state that is the minimum combustion state in which the internal combustion engine can continue to operate stably, and a fuel-cut state in which fuel injection to cylinders is stopped. In the idling state, the driving force of the internal combustion engine is a positive value. In the fuel-cut state, the driving force of the internal combustion engine is a negative value due to mechanical loss. The internal combustion engine cannot generate a driving force between the driving force in the idling state and the driving force in the fuel-cut state.

For example, it is assumed that the internal combustion engine is requested to generate a driving force between the driving force in the idling state and the driving force in the fuel-cut state during the coasting. When feedback control is performed in this state, the internal combustion engine may repeatedly switch from the idling state to the fuel-cut state and switch in reverse. When the internal combustion engine repeatedly switches between the idling state and the fuel-cut state, the driving force of the internal combustion engine and, as a result, the acceleration of the vehicle repeatedly change abruptly. As a result, riding comfort for occupants decreases.

A control device for a vehicle according to a first aspect of the present disclosure includes one or more processors configured to: perform feedback control on an acceleration of the vehicle by controlling a driving force of an internal combustion engine mounted on the vehicle based on a difference between a requested acceleration of the vehicle from an application and an actual acceleration of the vehicle; calculate a first predicted acceleration that is a predicted acceleration of the vehicle on an assumption that the internal combustion engine is controlled into a fuel-cut state; and control the internal combustion engine into the fuel-cut state without performing the feedback control when a coasting condition that is predetermined is satisfied and the first predicted acceleration is equal to or higher than a lower limit value that is predetermined as a negative value.

A control device for a vehicle according to a second aspect of the present disclosure includes one or more processors configured to: perform feedback control on an acceleration of the vehicle by controlling a driving force of an internal combustion engine mounted on the vehicle based on a difference between a requested acceleration of the vehicle from an application and an actual acceleration of the vehicle; calculate a second predicted acceleration that is a predicted acceleration of the vehicle on an assumption that the internal combustion engine is controlled into an idling state; and control the internal combustion engine into the idling state without performing the feedback control when a predetermined coasting condition is satisfied and the second predicted acceleration is equal to or higher than a lower limit value that is predetermined as a negative value and equal to or lower than an upper limit value that is predetermined as a negative value higher than the lower limit value.

A control method for a vehicle according to a third aspect of the present disclosure is executed by a computer mounted on the vehicle. The control method includes: performing feedback control on an acceleration of the vehicle by controlling a driving force of an internal combustion engine mounted on the vehicle based on a difference between a requested acceleration of the vehicle from an application and an actual acceleration of the vehicle; calculating a predicted acceleration of the vehicle on an assumption that the internal combustion engine is controlled into a predetermined state, the predetermined state being a fuel-cut state or an idling state; and controlling the internal combustion engine into the predetermined state without controlling the internal combustion engine into the predetermined state without performing the feedback control when a predetermined coasting condition is satisfied and the predicted acceleration is equal to or higher than a lower limit value that is predetermined as a negative value.

A non-transitory storage medium according to a fourth aspect of the present disclosure stores instructions that are executable by a computer mounted on a vehicle and that cause the computer to execute the control method according to the third aspect.

In each of the technical ideas described above, it is possible to achieve, when the coasting condition is satisfied, a state suitable for coasting in which the vehicle gradually decelerates while preventing the occurrence of a situation where abrupt changes in the acceleration of the vehicle are repeated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a control device for a vehicle, a control method for a vehicle, and a control program for a vehicle according to one embodiment will be described with reference to the drawings.

Powertrain

Figure 1:
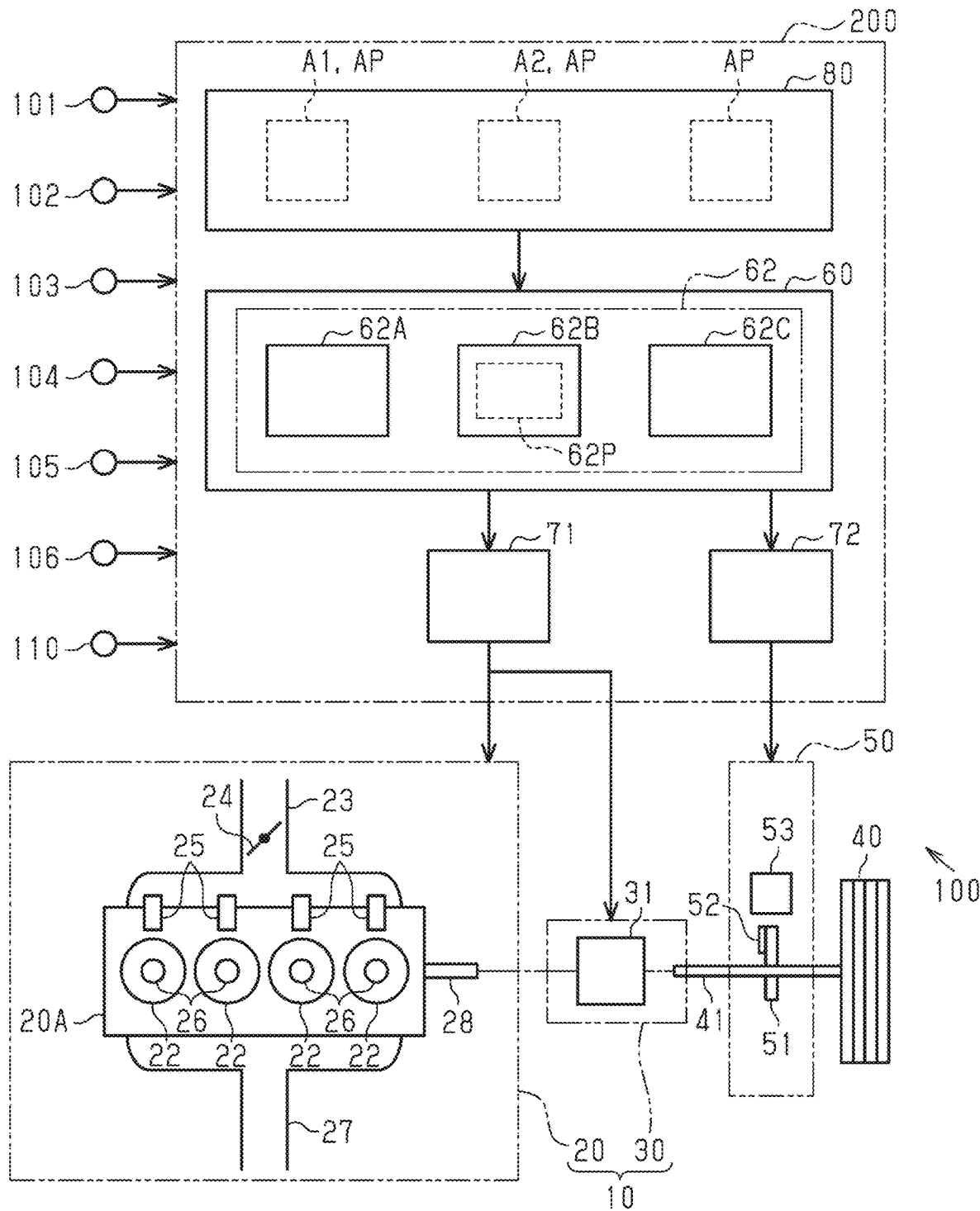
FIG. 1 is a schematic configuration diagram of a vehicle.

As shown in FIG. 1, a vehicle 100 includes a powertrain 10. The powertrain 10 includes an internal combustion engine 20 and a transmission mechanism 30. The internal combustion engine 20 is a drive source of the vehicle 100. The internal combustion engine 20 includes a plurality of cylinders 22, an intake passage 23, an exhaust passage 27, a throttle valve 24, fuel injection valves 25 for the individual cylinders 22, spark plugs 26 for the individual cylinders 22, and a crankshaft 28. Each cylinder 22 is a space defined in a body 20A of the internal combustion engine 20. The intake passage 23 is a passage for introducing intake air into each cylinder 22. The exhaust passage 27 is a passage for discharging exhaust gas from each cylinder 22. The throttle valve 24 adjusts the amount of intake air to be introduced into each cylinder 22. The fuel injection valve 25 supplies fuel into the cylinder 22. The spark plug 26 ignites the fuel in the cylinder 22. The crankshaft 28 rotates in response to combustion of the fuel in the cylinder 22.

Although illustration is omitted, the internal combustion engine 20 includes a plurality of sensors for detecting information on operating conditions of the internal combustion engine 20. Examples of the sensors include an air flow meter. The air flow meter detects the amount of intake air. Examples of the sensors include a crank position sensor. The crank position sensor detects a rotational position of the crankshaft 28. Each sensor outputs a signal based on the information detected by itself to an ECU group 200 described later.

The transmission mechanism 30 transmits the rotation of the crankshaft 28 to wheels 40. The transmission mechanism 30 includes an automatic transmission 31 that changes and outputs the rotation speed of the crankshaft 28, axles 41 connected to the wheels 40, etc. The axle 41 serves as an output shaft of the transmission mechanism 30.

Hydraulic Brakes

The vehicle 100 includes a plurality of hydraulic brakes 50. FIG. 1 shows only one of the hydraulic brakes 50 as a representative. The hydraulic brake 50 is provided for each wheel 40 of the vehicle 100. The hydraulic brake 50 includes a rotator 51, a friction member 52, and a hydraulic mechanism 53. The rotator 51 rotates together with the wheel 40. The friction member 52 is pressed against the rotator 51 by operating based on a hydraulic pressure. The hydraulic mechanism 53 generates a hydraulic pressure for operating the friction member 52. The hydraulic brake 50 constitutes a brake device.

Information Acquisition Devices

The vehicle 100 includes a plurality of information acquisition devices. The information acquisition devices include devices that detect traveling conditions of the vehicle 100. Examples of this type of information acquisition device include a vehicle speed sensor 101 that detects a vehicle speed that is a traveling speed of the vehicle 100. Examples of this type of information acquisition device include an acceleration sensor 102 that detects an acceleration of the vehicle 100. The acceleration of the vehicle 100 herein refers to an acceleration in a direction along a longitudinal axis of the vehicle 100. The information acquisition devices include devices that detect surrounding information or position information of the vehicle 100. Examples of this type of information acquisition device include a camera 103 that captures an image of the surroundings of the vehicle 100. Examples of this type of information acquisition device include a position receiver 104 that receives information on current position coordinates of the vehicle 100 from global positioning satellites. The information acquisition devices include switches that acquire instructions from a driver. Examples of this type of information acquisition device include an instruction switch 105 to be used by an occupant to instruct an application AP described later about a target vehicle speed. Examples of this type of information acquisition device include an ignition switch 106 to be used by an occupant to give an instruction to start the vehicle 100. The ignition switch 106 is also called "start switch" or "system start switch". Each information acquisition device outputs a signal based on the information acquired by itself to the ECU group 200 described later.

The acceleration of the vehicle 100 described above takes a positive or negative value. The signs of the acceleration of the vehicle 100 are herein handled as follows. That is, the acceleration of the vehicle 100 takes a positive value when the vehicle 100 accelerates forward, and takes a negative value when the vehicle 100 accelerates rearward.

Navigation Device

The vehicle 100 includes a navigation device 110. The navigation device 110 prestores map data. The map data includes a plurality of nodes and a plurality of links. Each node indicates position coordinates expressed in latitude and longitude. Each link is defined as a line segment connecting adjacent nodes. Each link indicates a road. The map data includes information on road surface gradients between adjacent nodes. The navigation device 110 acquires current position coordinates of the vehicle 100 received by the position receiver 104. Thus, the navigation device 110 constantly grasps the current position of the vehicle 100 on the map data. The navigation device 110 outputs various types of information grasped from the map data to the ECU group 200 described later as necessary.

Drive System ECU

The vehicle 100 includes the ECU group 200. The ECU group 200 includes a plurality of ECUs. The term "ECU" is an abbreviation for "electronic control unit". The ECUs can exchange information with each other via an internal bus (not shown). The ECUs will be described individually below.

The vehicle 100 includes a drive system ECU 71. The drive system ECU 71 is a computer including a processing circuit. The processing circuit includes a central processing unit (CPU), a nonvolatile memory, and a volatile memory. The nonvolatile memory prestores various programs describing processes to be executed by the CPU and various types of data required for the CPU to execute the programs. The drive system ECU 71 controls the powertrain 10 including the internal combustion engine 20 based on instruction information from a general ECU 60 described later. When controlling the internal combustion engine 20, the drive system ECU 71 operates target devices such as the throttle valve 24, the fuel injection valves 25, and the spark plugs 26. When fuel is burned in the cylinders 22, the crankshaft 28 rotates. The internal combustion engine 20 generates a driving force. That is, the drive system ECU 71 controls the driving force of the internal combustion engine 20 by operating the target devices. The drive system ECU 71 also controls components of the transmission mechanism 30, such as the automatic transmission 31. Through these processes on the internal combustion engine 20 and the transmission mechanism 30, the drive system ECU 71 controls the driving force generated by the internal combustion engine 20 and, as a result, the driving force generated by the powertrain 10. The drive system ECU 71 controls the internal combustion engine 20 into a fuel-cut state or an idling state as necessary. The fuel-cut state is a state in which fuel supply to the cylinders 22 is stopped, that is, a state in which combustion of fuel in the internal combustion engine 20 is stopped. The idling state is a state in which the internal combustion engine 20 continues to burn fuel and maintains the rotation speed of the crankshaft 28 at an idling rotation speed. The idling rotation speed is the minimum rotation speed of the crankshaft 28 at which the internal combustion engine 20 can continue to operate stably. The driving force generated by the internal combustion engine 20 will be hereinafter referred to as "driving force of internal combustion engine 20". The driving force generated by the powertrain 10 will be referred to as "driving force of powertrain 10".

The drive system ECU 71 constantly grasps a current operating state of the powertrain 10 based on details of control on the internal combustion engine 20, such as the amount of fuel injection, details of control on the transmission mechanism 30, such as a gear ratio of the automatic transmission 31, and pieces of information from various sensors in the vehicle 100. The drive system ECU 71 repeatedly calculates a basic driving force, a fuel-cut driving force, and an idling driving force based on the operating state etc. The basic driving force is a driving force of the powertrain 10 at a current point in time. The fuel-cut driving force is a driving force of the powertrain 10 on the assumption that the internal combustion engine 20 is controlled into the fuel-cut state under the same conditions as those at the current point in time. The "same conditions" mean that the values of all parameters related to the operation of the powertrain 10 are the same, except for details of control on the internal combustion engine 20. Examples of the parameters related to the operation of the powertrain 10 include a gear ratio of the transmission mechanism 30, including the gear ratio of the automatic transmission 31. Examples of the parameters related to the operation of the powertrain 10 include a vehicle speed. The vehicle speed has a correlation with the rotation speed of the axle 41 that is the output shaft of the transmission mechanism 30. The idling driving force is a driving force of the powertrain 10 on the assumption that the internal combustion engine 20 is controlled into the idling state under the same conditions as those at the current point in time. The idling driving force is larger than the fuel-cut driving force. The drive system ECU 71 outputs the calculated basic driving force, fuel-cut driving force, and idling driving force to the general ECU 60 described later.

The driving force of the powertrain 10 takes a positive or negative value. For example, the fuel-cut driving force is a negative value. In the vehicle 100 traveling forward, the positive driving force accelerates the vehicle 100, while the negative driving force decelerates the vehicle 100.

Brake ECU

The vehicle 100 includes a brake ECU 72. The brake ECU 72 is a computer including a processing circuit. The processing circuit includes a CPU, a nonvolatile memory, and a volatile memory. The nonvolatile memory prestores various programs describing processes to be executed by the CPU and various types of data required for the CPU to execute the programs. The brake ECU 72 controls each hydraulic brake 50 based on instruction information from the general ECU 60 described later. The brake ECU 72 operates the hydraulic mechanism 53 when controlling the hydraulic brake 50. When the friction member 52 is pressed against the rotator 51, a braking force is generated in the vehicle 100. That is, the brake ECU 72 controls the braking force of the hydraulic brake 50 by operating the hydraulic mechanism 53.

Command ECU

The vehicle 100 includes a command ECU 80. The command ECU 80 is a computer including a processing circuit. The processing circuit includes a CPU, a nonvolatile memory, and a volatile memory. The nonvolatile memory prestores various programs describing processes to be executed by the CPU and various types of data required for the CPU to execute the programs. Examples of the programs stored in the nonvolatile memory include a plurality of applications AP for controlling motions of the vehicle 100. FIG. 1 shows three of the applications AP as representatives. The command ECU 80 functions as an execution device that executes the applications AP stored therein. Examples of the applications AP include an adaptive cruise control (ACC) application A1 that implements functions such as traveling at a constant target vehicle speed and following a preceding vehicle. Examples of the applications AP include an autonomous driving (AD) application A2 that implements an autonomous driving function for causing the vehicle 100 to travel autonomously without a driver's operation. The command ECU 80 executes necessary applications AP as needed based on information from the information acquisition devices.

When executing a specific application AP, the command ECU 80 outputs motion request information indicating a motion request for the application AP to be executed. Specifically, the command ECU 80 outputs a requested acceleration as the motion request information. The requested acceleration is a requested value of the acceleration for the vehicle 100. In addition to the requested acceleration, the command ECU 80 may output a coasting request signal as the motion request information. The coasting request signal is a signal for requesting the vehicle 100 to decelerate by coasting. In the following description, the content in which the command ECU 80 is mainly involved may be described as a content in which the application AP to be executed is mainly involved. For example, the output of the coasting request signal by the command ECU 80 is described as an output of the coasting request signal by the application AP.

Coasting Request Signal

A situation where the application AP outputs the coasting request signal will be described. The application AP such as the ACC application A1 or the AD application A2 outputs the requested acceleration so that the actual vehicle speed agrees with the target vehicle speed when there is no preceding vehicle. For example, the target vehicle speed is specified by an occupant using the instruction switch 105 or is set by the application AP itself based on information from the camera 103. Depending on the traveling situation of the vehicle 100, the actual vehicle speed may exceed the target vehicle speed. In this case, the application AP outputs a negative requested acceleration to decelerate the vehicle 100 until the actual vehicle speed decreases to the target vehicle speed. When the absolute value of a difference between the actual vehicle speed and the target vehicle speed is equal to or smaller than a predetermined value in the case where the actual vehicle speed exceeds the target vehicle speed, the application AP outputs the coasting request signal together with the requested acceleration. For example, the application AP continues to output the coasting request signal until the actual vehicle speed decreases to the target vehicle speed after the actual vehicle speed has exceeded the target vehicle speed. The predetermined value is determined in advance through experiment or simulation as a value that can eliminate the difference between the actual vehicle speed and the target vehicle speed, for example, on a scale of several seconds when the vehicle 100 decelerates by coasting without using the hydraulic brakes 50. In this way, the conditions for outputting the coasting request signal are that the actual vehicle speed is higher than the target vehicle speed and that the difference between the actual vehicle speed and the target vehicle speed is equal to or smaller than the predetermined value.

Examples of the case where the actual vehicle speed exceeds the target vehicle speed include a case where the target vehicle speed is reduced while the vehicle 100 is traveling at a constant target vehicle speed. Examples of the case where the actual vehicle speed exceeds the target vehicle speed include a case where the increase in the target vehicle speed is stopped while the actual vehicle speed is increasing following the continuous increase in the target vehicle speed. In this case, the actual vehicle speed temporarily exceeds the target vehicle speed in relation to the response of the actual vehicle speed to the target vehicle speed. Examples of the case where the actual vehicle speed exceeds the target vehicle speed also include the following case. That is, while the actual vehicle speed has exceeded the target vehicle speed in response to depression of an accelerator pedal by an occupant, the occupant releases the accelerator pedal and the application AP takes over control on the traveling of the vehicle 100 from the occupant.

General ECU

The vehicle 100 includes the general ECU 60. The general ECU 60 constitutes a control device for the vehicle 100. The general ECU 60 is a computer including a processing circuit 62. The processing circuit 62 includes a CPU 62A, a nonvolatile memory 62B, and a volatile memory 62C. The nonvolatile memory 62B prestores various control programs 62P describing processes to be executed by the CPU 62A and various types of data required for the CPU 62A to execute the control programs 62P. When the CPU 62A of the general ECU 60 executes the control programs 62P stored in the nonvolatile memory 62B, the general ECU 60 functions as a motion manager that manages motion requests from the applications AP. That is, the general ECU 60 is a control entity of a control method for the vehicle 100. The functions of the general ECU 60 serving as the motion manager will be described below.

The general ECU 60 constantly receives motion request information from the application AP. When motion request information is acquired from the application AP, the general ECU 60 controls the powertrain 10 and each hydraulic brake 50 to fulfill the motion request from the application AP. At this time, the general ECU 60 outputs instruction information related to control on the powertrain 10 to the drive system ECU 71. The instruction information related to the control on the powertrain 10 includes a requested driving force of the powertrain 10. In response to this instruction information, the drive system ECU 71 controls the powertrain 10 including the internal combustion engine 20. Since the general ECU 60 outputs the instruction information for controlling the powertrain 10 as described above, the control entity of the internal combustion engine 20 and therefore the powertrain 10 is the general ECU 60. Similarly, the general ECU 60 outputs instruction information related to control on the hydraulic brake 50 to the brake ECU 72 to fulfill the motion request. The instruction information related to the control on the hydraulic brake 50 includes a requested braking force of the hydraulic brake 50. In response to this instruction information, the brake ECU 72 controls the hydraulic brake 50. Since the general ECU 60 outputs the instruction information for controlling the hydraulic brake 50, the control entity of the hydraulic brake 50 is the general ECU 60.

The general ECU 60 may perform feedback control on the acceleration of the vehicle 100 to fulfill a motion request from the application AP. When performing the feedback control, the general ECU 60 adjusts the driving force of the internal combustion engine 20 and therefore the powertrain 10 to reduce a difference between the requested acceleration from the application AP and an actual acceleration WQ of the vehicle 100. That is, the general ECU 60 controls the driving force of the internal combustion engine 20 based on the difference between the requested acceleration from the application AP and the actual acceleration WQ of the vehicle 100. Through this operation, the general ECU 60 performs the feedback control on the acceleration of the vehicle 100. The general ECU 60 may also control the braking force of the hydraulic brake 50 when performing the feedback control. In the present embodiment, the general ECU 60 calculates the actual acceleration WQ based on an acceleration detected by the acceleration sensor 102 and a value obtained by differentiating a vehicle speed detected by the vehicle speed sensor 101.

Overview of Coasting Process

The general ECU 60 can perform a coasting process as a function of the motion manager. The general ECU 60 performs the coasting process when a predetermined coasting condition is satisfied. The coasting condition of the present embodiment is that the general ECU 60 has acquired a coasting request signal from the application AP.

The general ECU 60 prestores a lower limit value and an upper limit value of a setting range R related to the acceleration of the vehicle 100 as information to be used in the coasting process. The setting range R is a range of the acceleration permissible when the vehicle 100 coasts. A coasting lower limit value RD that is the lower limit value of the setting range R is predetermined as a negative value.

A coasting upper limit value RU that is the upper limit value of the setting range R is also predetermined as a negative value. For example, the coasting upper limit value RU is slightly smaller than zero. The coasting lower limit value RD and the coasting upper limit value RU are predetermined through experiment or simulation as boundary values of the setting range R at which the occupant can obtain a moderate sense of deceleration when the vehicle 100 coasts.

In the coasting process, the general ECU 60 calculates a first predicted acceleration W1 and a second predicted acceleration W2. The first predicted acceleration W1 is a predicted acceleration of the vehicle 100 based on the traveling conditions of the vehicle 100 at the time of calculation of the first predicted acceleration W1 on the assumption that the internal combustion engine 20 is controlled into the fuel-cut state. The second predicted acceleration W2 is a predicted acceleration of the vehicle 100 based on the traveling conditions of the vehicle 100 at the time of calculation of the second predicted acceleration W2 on the assumption that the internal combustion engine 20 is controlled into the idling state. The first predicted acceleration W1 is repeatedly calculated over the entire period in which the application AP continues to output the coasting request signal. The same applies to the second predicted acceleration W2.

Figure 2:
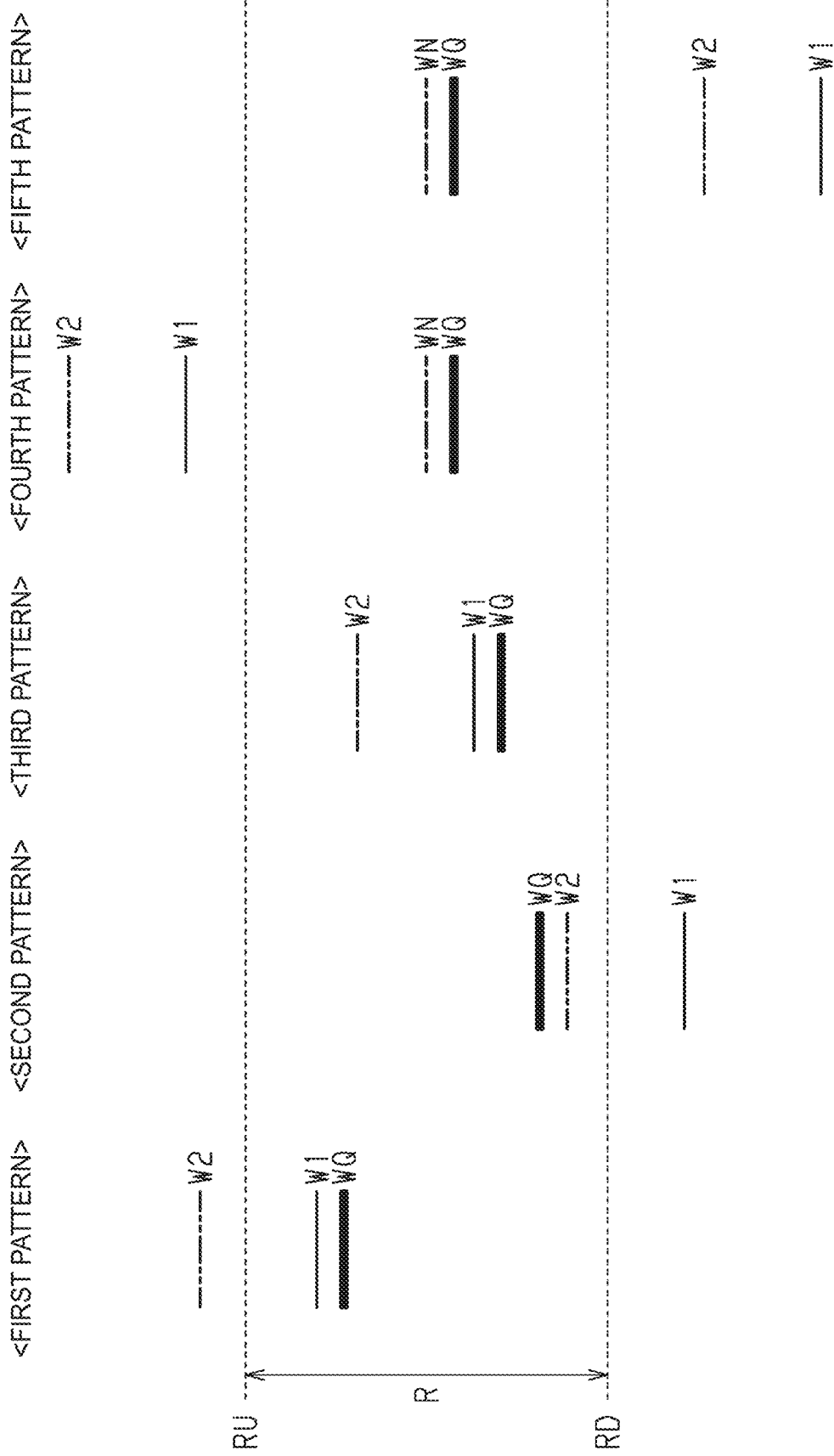
FIG. 2 is a schematic diagram showing possible patterns of predicted accelerations for a setting range.

In the coasting process, the general ECU 60 changes the control mode of the internal combustion engine 20 depending on the magnitudes of the first predicted acceleration W1 and the second predicted acceleration W2 with respect to the setting range R. As shown in FIG. 2, there are the following five possible patterns of the first predicted acceleration W1 and the second predicted acceleration W2 for the setting range R.

(First pattern) The first predicted acceleration W1 is equal to or higher than the coasting lower limit value RD and equal to or lower than the coasting upper limit value RU, and the second predicted acceleration W2 is higher than the coasting upper limit value RU.
(Second pattern) The first predicted acceleration W1 is lower than the coasting lower limit value RD, and the second predicted acceleration W2 is equal to or higher than the coasting lower limit value RD and equal to or lower than the coasting upper limit value RU.
(Third pattern) Both the first predicted acceleration W1 and the second predicted acceleration W2 are equal to or higher than the coasting lower limit value RD and equal to or lower than the coasting upper limit value RU.
(Fourth pattern) Both the first predicted acceleration W1 and the second predicted acceleration W2 are higher than the coasting upper limit value RU.
(Fifth pattern) Both the first predicted acceleration W1 and the second predicted acceleration W2 are lower than the coasting lower limit value RD.

The general ECU 60 controls the internal combustion engine 20 in each pattern as follows. In the first pattern, the general ECU 60 controls the internal combustion engine 20 into the fuel-cut state without performing feedback control on the acceleration. In the second pattern, the general ECU 60 controls the internal combustion engine 20 into the idling state without performing feedback control on the acceleration. In the third pattern, the general ECU 60 controls the internal combustion engine 20 into the fuel-cut state without performing feedback control on the acceleration. In the fourth pattern, the general ECU 60 performs feedback control on the acceleration through control on both the driving force of the internal combustion engine 20 and the braking force of each hydraulic brake 50. In this case, the general ECU 60 calculates a set acceleration WN as a new requested acceleration in place of the requested acceleration from the application AP. The general ECU 60 performs feedback control based on a difference between the set acceleration WN and the actual acceleration WQ. In the fifth pattern, the general ECU 60 performs feedback control on the acceleration through control on the driving force of the internal combustion engine 20. In this case, the general ECU 60 performs feedback control based on the difference between the set acceleration WN and the actual acceleration WQ as in the fourth pattern.

Details of Coasting Process

The general ECU 60 starts the coasting process when the coasting condition is satisfied, that is, when a coasting request is acquired from the application AP. The general ECU 60 repeatedly performs the coasting process during a period in which the application AP is outputting the coasting request signal, that is, during a period in which the coasting request is acquired from the application AP. While the coasting process is being performed, the general ECU 60 cancels the process that is normally performed in order to fulfill the motion request from the application AP. When the application AP finishes outputting the coasting request signal, the general ECU 60 stops performing the coasting process and resumes the normal process.

Figure 3:
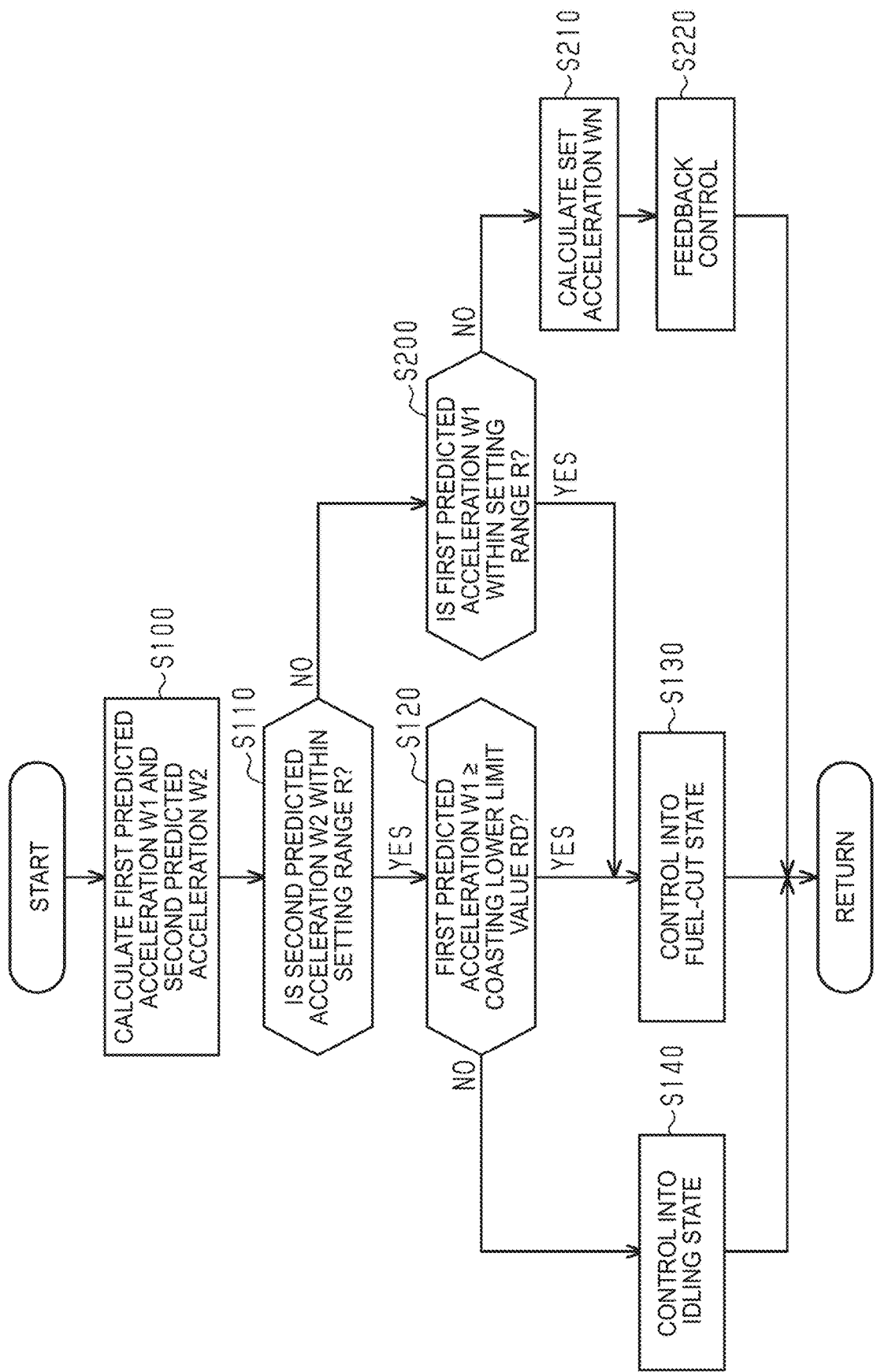
FIG. 3 is a flowchart showing a processing procedure of a coasting process.

When the coasting process is started, the general ECU 60 first performs a process of step S100 as shown in FIG. 3. In step S100, the general ECU 60 calculates the first predicted acceleration W1 and the second predicted acceleration W2. When calculating the first predicted acceleration W1, the general ECU 60 acquires the latest fuel-cut driving force calculated by the drive system ECU 71. The general ECU 60 calculates the first predicted acceleration W1 based on this fuel-cut driving force. For example, the general ECU 60 calculates the first predicted acceleration W1 as follows. The general ECU 60 divides the fuel-cut driving force by a prestored standard weight of the vehicle 100. In this way, the general ECU 60 calculates a fuel-cut conversion value by converting the fuel-cut driving force into an acceleration dimension. Next, the general ECU 60 acquires the latest basic driving force calculated by the drive system ECU 71. The general ECU 60 calculates a basic conversion value by dividing the basic driving force by the standard weight. Next, the general ECU 60 calculates the latest actual acceleration WQ. As described above, the general ECU 60 calculates the actual acceleration WQ based on the acceleration of the vehicle 100 detected by the acceleration sensor 102 and the vehicle speed detected by the vehicle speed sensor 101. After calculating the actual acceleration WQ and the basic conversion value, the general ECU 60 adjusts the fuel-cut conversion value based on the magnitude relationship between the two values. The general ECU 60 sets the adjusted value as the first predicted acceleration W1. The difference between the actual acceleration WQ and the basic conversion value reflects an increase or decrease in the actual acceleration WQ with respect to the basic conversion value depending on, for example, the road surface gradient. In the first predicted acceleration W1, the traveling situation of the vehicle 100 depending on the road surface gradient is taken into consideration.

As described above, the general ECU 60 calculates the second predicted acceleration W2 in addition to the first predicted acceleration W1 in step S100. When calculating the second predicted acceleration W2, the general ECU 60 uses the idling driving force instead of using the fuel-cut driving force when the first predicted acceleration W1 is calculated. The general ECU 60 calculates the second predicted acceleration W2 based on the idling driving force by the same method as in the calculation of the first predicted acceleration W1. That is, when calculating the second predicted acceleration W2, the general ECU 60 first acquires the latest idling driving force from the drive system ECU 71. The general ECU 60 calculates the second predicted acceleration W2 by converting the idling driving force into an acceleration dimension and adjusting the converted value based on the magnitude relationship between the actual acceleration WQ and the basic conversion value. Further description about the calculation of the second predicted acceleration W2 will be omitted. When the first predicted acceleration W1 and the second predicted acceleration W2 are calculated, the general ECU 60 advances the process to step S110. As can be seen from the method for determining the fuel-cut driving force serving as the basis for the first predicted acceleration W1, the first predicted acceleration W1 of the present embodiment is substantially an acceleration of the vehicle 100 on the assumption that the internal combustion engine 20 is controlled into the fuel-cut state at the current point in time. Similarly, the second predicted acceleration W2 is an acceleration of the vehicle 100 on the assumption that the internal combustion engine 20 is controlled into the idling state at the current point in time.

In step S110, the general ECU 60 determines whether the second predicted acceleration W2 is within the setting range R. When the second predicted acceleration W2 is equal to or higher than the coasting lower limit value RD and equal to or lower than the coasting upper limit value RU (step S110: YES), the general ECU 60 advances the process to step S120.

In step S120, the general ECU 60 determines whether the first predicted acceleration W1 is within the setting range R. The general ECU 60 substantially determines whether the first predicted acceleration W1 is equal to or higher than the coasting lower limit value RD. When the first predicted acceleration W1 is equal to or higher than the coasting lower limit value RD (step S120: YES), the general ECU 60 advances the process to step S130. The situation where the determination result is "YES" in step S120 is the situation of the third pattern described above.

In step S130, the general ECU 60 outputs first instruction information to the drive system ECU 71. The first instruction information is an instruction for the fuel-cut driving force as the requested driving force of the powertrain 10. The first instruction information includes an instruction to control the internal combustion engine 20 into the fuel-cut state in addition to the instruction for the driving force itself. In response to the first instruction information, the drive system ECU 71 controls the internal combustion engine 20 into the fuel-cut state. The general ECU 60 continues to output the first instruction information for a predetermined control period such as one second. After the first instruction information is output for the control period, the general ECU 60 terminates the process of step S130. Then, the general ECU 60 returns the process to step S100. The general ECU 60 performs the coasting process from the beginning. In step S130, the drive system ECU 71 maintains details of control on the powertrain 10 except the internal combustion engine 20 at the time when the process of step S130 is started. Accordingly, the gear ratio of the transmission mechanism 30 is maintained constant while the process of step S130 is being performed. Although detailed description will be omitted, the gear ratio of the transmission mechanism 30 is maintained, in steps S140 and S220 described later, at the gear ratios at the time when the respective processes are started, as in step S130. In step S130, the general ECU 60 outputs, to the brake ECU 72, instruction information on an instruction for a zero braking force.

In relation to step S130, the drive system ECU 71 is set to function as follows. That is, after the output of the first instruction information is finished along with the finish of step S130, the drive system ECU 71 maintains the powertrain 10 in the control state at the time when the process of step S130 is finished, until the next instruction information is acquired. The same applies to steps S140 and S220 described later. That is, after the processes of steps S140 and S220, the drive system ECU 71 maintains the powertrain 10 in the control state at the time when the respective processes are finished, until the next instruction information is acquired. The same applies to the brake ECU 72.

When the first predicted acceleration W1 is lower than the coasting lower limit value RD in step S120 (step S120: NO), the general ECU 60 advances the process to step S140. The situation where the determination result is "NO" in step S120 is the situation of the second pattern described above.

In step S140, the general ECU 60 outputs second instruction information to the drive system ECU 71. The second instruction information is an instruction for the idling driving force as the requested driving force of the powertrain 10. The second instruction information includes an instruction to control the internal combustion engine 20 into the idling state in addition to the instruction for the driving force itself. In response to the second instruction information, the drive system ECU 71 controls the internal combustion engine 20 into the idling state. The general ECU 60 continues to output the second instruction information for the control period as in step S130. After the second instruction information is output for the control period, the general ECU 60 terminates the process of step S140. Then, the general ECU 60 returns the process to step S100. The instruction information for the brake ECU 72 in step S140 is handled in the same manner as in step S130.

When the second predicted acceleration W2 is lower than the coasting lower limit value RD or higher than the coasting upper limit value RU in step S110 (step S110: NO), the general ECU 60 advances the process to step S200.

In step S200, the general ECU 60 determines whether the first predicted acceleration W1 is within the setting range R. When the first predicted acceleration W1 is equal to or higher than the coasting lower limit value RD and equal to or lower than the coasting upper limit value RU (step S200: YES), the general ECU 60 advances the process to step S130. The process of step S130 is as described above. The situation where the determination result is "YES" in step S200 is the situation of the first pattern described above.

When the first predicted acceleration W1 is lower than the coasting lower limit value RD or higher than the coasting upper limit value RU in step S200 (step S200: NO), the general ECU 60 advances the process to step S210. The situation where the determination result is "NO" in step S200 is the situation of the fourth or fifth pattern described above.

In step S210, the general ECU 60 calculates the set acceleration WN as a new requested acceleration in place of the requested acceleration from the application AP. Specifically, the general ECU 60 calculates a coasting median value that is a median value between the coasting lower limit value RD and the coasting upper limit value RU. The general ECU 60 sets the coasting median value as the set acceleration WN. The general ECU 60 erases the requested acceleration acquired from the application AP together with the coasting request signal. The general ECU 60 changes the settings to handle the set acceleration WN as the requested acceleration. The general ECU 60 advances the process to step S220.

In step S220, the general ECU 60 performs feedback control on the acceleration. Specifically, the general ECU 60 repeats the following serial feedback process. In the feedback process, the general ECU 60 first calculates the latest actual acceleration WQ based on pieces of detection information from the acceleration sensor 102 and the vehicle speed sensor 101. The general ECU 60 calculates an acceleration difference by subtracting the actual acceleration WQ from the set acceleration WN. The general ECU 60 calculates the driving force of the powertrain 10 and the braking force of each hydraulic brake 50 necessary to eliminate the acceleration difference. The general ECU 60 outputs pieces of instruction information for the driving force and the braking force to the drive system ECU 71 and the brake ECU 72 based on the calculated values. The feedback process is performed in the manner described above. The general ECU 60 repeats the feedback process for the control period. When the control period has elapsed since the start of the process of step S220, the general ECU 60 terminates the process of step S220. Then, the general ECU 60 returns the process to step S100.

The following can be said regarding the control on the powertrain 10 and the hydraulic brake 50 in step S220. When both the first predicted acceleration W1 and the second predicted acceleration W2 are higher than the coasting upper limit value RU as in the fourth pattern described above, the general ECU 60 basically controls the internal combustion engine 20 into the fuel-cut state and increases or reduces the braking force of the hydraulic brake 50. When both the first predicted acceleration W1 and the second predicted acceleration W2 are lower than the coasting lower limit value RD as in the fifth pattern described above, the general ECU 60 basically sets the braking force of the hydraulic brake 50 to zero and increases or reduces the driving force of the internal combustion engine 20 and therefore the powertrain 10.

Operations of Embodiment

In a case where the situation when the application AP outputs the coasting request signal is the situation of the first or third pattern (step S120: YES, step S200: YES), the general ECU 60 controls the internal combustion engine 20 into the fuel-cut state (step S130). Along with this, the actual acceleration WQ of the vehicle 100 reaches a value close to the first predicted acceleration W1 as shown in FIG. 2. For example, when the situation of the first or third pattern continues for a period in which the application AP continues to output the coasting request signal, the general ECU 60 continues to control the internal combustion engine 20 into the fuel-cut state during that period. In the first and third patterns shown in FIG. 2, the actual acceleration WQ is shown as a value lower than the first predicted acceleration W1, but this is for convenience. The same applies to the other patterns.

In a case where the situation when the application AP outputs the coasting request signal is the situation of the second pattern (step S120: NO), the general ECU 60 controls the internal combustion engine 20 into the idling state (step S140). Along with this, the actual acceleration WQ of the vehicle 100 reaches a value close to the second predicted acceleration W2 as shown in FIG. 2. For example, when the situation of the second pattern continues for the period in which the application AP continues to output the coasting request signal, the general ECU 60 continues to control the internal combustion engine 20 into the idling state during that period.

In a case where the situation when the application AP outputs the coasting request signal is the situation of the fourth or fifth pattern (step S200: NO), the general ECU 60 performs feedback control on the acceleration using the set acceleration WN as a target value (step S220). Along with this, the actual acceleration WQ of the vehicle 100 reaches a value close to the set acceleration WN as shown in FIG. 2.

Effects of Embodiment (1) As described in the operations of the embodiment, the general ECU 60 does not perform feedback control on the acceleration when the negative acceleration that is equal to or higher than the coasting lower limit value RD and equal to or lower than the coasting upper limit value RU can be satisfied by controlling the internal combustion engine 20 into the fuel-cut state as in the first pattern. Since the feedback control is not performed, the internal combustion engine 20 does not repeatedly switch between the fuel-cut state and the idling state so that the actual acceleration WQ of the vehicle 100 agrees with the requested acceleration. Therefore, the driving force of the powertrain 10 and therefore the actual acceleration WQ of the vehicle 100 do not increase or decrease repeatedly. When the general ECU 60 controls the internal combustion engine 20 into the fuel-cut state, the actual acceleration WQ of the vehicle 100 reaches the negative acceleration that is equal to or higher than the coasting lower limit value RD and equal to or lower than the coasting upper limit value RU. Therefore, it is possible to achieve, when the coasting condition is satisfied, a state suitable for coasting in which the vehicle 100 gradually decelerates while preventing the occurrence of the situation where abrupt changes in the acceleration of the vehicle 100 are repeated.

In the above embodiment, the following situation may occur during the period in which the coasting condition is satisfied, that is, during the period in which the application AP continues to output the coasting request signal. That is, during the above period, the current pattern of the vehicle 100 may be switched, for example, from the second pattern to the third pattern due to a significant change in the first predicted acceleration W1 and the second predicted acceleration W2. In this case, the operation state of the internal combustion engine 20 may be switched between the fuel-cut state and the idling state during the above period. However, the first predicted acceleration W1 and the second predicted acceleration W2 change significantly in a case where the traveling conditions of the vehicle 100 change, such as a case where the road surface gradient of the road where the vehicle 100 is traveling changes. During a relatively short period in which the vehicle 100 continues to coast, it is rare for the traveling conditions of the vehicle 100 to repeatedly change many times. Therefore, in the above embodiment, the operation state of the internal combustion engine 20 does not repeatedly switch multiple times, for example, within a few seconds. Even if there is a change in the traveling conditions of the vehicle 100, the operation state of the internal combustion engine 20 is switched in response to the change. Therefore, the vehicle 100 can coast flexibly in the appropriate operation state of the internal combustion engine 20 depending on the traveling condition of the vehicle 100.

(2) The general ECU 60 does not perform feedback control on the acceleration when the acceleration that is equal to or higher than the coasting lower limit value RD and equal to or lower than the coasting upper limit value RU can be satisfied by controlling the internal combustion engine 20 into the idling state as in the second pattern. Since the feedback control is not performed, the internal combustion engine 20 does not repeatedly switch between the fuel-cut state and the idling state in response to the feedback control as in (1). When the internal combustion engine 20 is controlled into the idling state, the actual acceleration WQ of the vehicle 100 reaches the negative acceleration that is equal to or higher than the coasting lower limit value RD and equal to or lower than the coasting upper limit value RU. Therefore, as in (1), it is possible to achieve, when the coasting condition is satisfied, a state suitable for coasting in which the vehicle 100 gradually decelerates while preventing the occurrence of the situation where abrupt changes in the acceleration of the vehicle 100 are repeated.

(3) The general ECU 60 controls the internal combustion engine 20 into the fuel-cut state when the acceleration that is equal to or higher than the coasting lower limit value RD and equal to or lower than the coasting upper limit value RU can be satisfied regardless of whether the internal combustion engine 20 is controlled into the fuel-cut state or the idling state as in the third pattern. By giving priority to the fuel-cut state in this way, fuel efficiency is improved.

(4) The general ECU 60 performs the following operation when the acceleration that is equal to or higher than the coasting lower limit value RD and equal to or lower than the coasting upper limit value RU cannot be satisfied regardless of whether the internal combustion engine 20 is controlled into the fuel-cut state or the idling state as in the fourth or fifth pattern. That is, the general ECU 60 performs feedback control on the acceleration while using the hydraulic brakes 50 as necessary. At this time, the general ECU 60 handles, as the requested acceleration, the set acceleration WN that is equal to or higher than the coasting lower limit value RD and equal to or lower than the coasting upper limit value RU. Along with this, the actual acceleration WQ of the vehicle 100 can be made approximately equal to those in the first, second, and third patterns in which no feedback control is performed.

Modifications

The above embodiment can be modified as follows. The above embodiment and the following modifications can be combined as long as no technical contradiction arises.

Regarding step S100 of the coasting process, the method for calculating the first predicted acceleration W1 is not limited to the example of the above embodiment. For example, information on a road surface gradient in the map data stored in the navigation device 110 may be used when adjusting the fuel-cut conversion value. The first predicted acceleration W1 may be calculated by adjusting the fuel-cut conversion value based on the actual road surface gradient at the point where the vehicle 100 is traveling. The method for calculating the first predicted acceleration W1 is not limited as long as an appropriate value can be calculated as the predicted acceleration of the vehicle 100 on the assumption that the internal combustion engine 20 is controlled into the fuel-cut state. The same applies to the second predicted acceleration W2. That is, the method for calculating the second predicted acceleration W2 is not limited as long as an appropriate value can be calculated as the predicted acceleration of the vehicle 100 on the assumption that the internal combustion engine 20 is controlled into the idling state.

Regarding the calculation of the first predicted acceleration W1, the general ECU 60 may calculate the fuel-cut driving force serving as the basis for the first predicted acceleration W1. In this case, it is appropriate that the general ECU 60 can acquire information necessary to calculate the fuel-cut driving force, such as various control details for the powertrain 10. The same applies to the idling driving force.

Regarding step S210, the set acceleration WN is not limited to the example of the above embodiment. The set acceleration WN may be any value that is equal to or higher than the coasting lower limit value RD and equal to or lower than the coasting upper limit value RU. It is appropriate that the set acceleration WN be determined as a value at which the occupant can obtain an appropriate sense of deceleration in consideration of the road surface gradient etc. The set acceleration WN may be changed during the execution of feedback control.

The process of step S210 may be omitted. That is, it is not essential to use the set acceleration WN as a target value for feedback control on the acceleration. In the feedback control of step S220, the requested acceleration from the application AP may be used as the target value. For example, when the requested acceleration from the application AP is slightly outside the setting range R, an acceleration close to the setting range R can be achieved even if this requested acceleration is used as the target value for the feedback control.

The brake device to be controlled for the feedback control on the acceleration is not limited to the example of the above embodiment. That is, the brake device is not limited to the hydraulic brake 50 but may be any device that can generate a braking force on the vehicle 100. For example, the vehicle 100 may include a motor generator. The feedback control may be performed by using a braking force generated by causing the motor generator to generate regenerative power. The automatic transmission 31 may be used as the brake device. That is, the absolute value of the negative driving force of the powertrain 10 may be increased or reduced by changing the gear ratio of the automatic transmission 31.

In the above embodiment, in the case of the third pattern (step S120: YES), the process proceeds to step S130 and the internal combustion engine 20 is controlled into the fuel-cut state. However, it is not essential to control the internal combustion engine 20 into the fuel-cut state in the case of the third pattern. That is, in the case of the third pattern, the process may proceed to step S140 and the internal combustion engine 20 may be controlled into the idling state. For example, in the case of the third pattern, it may be desired to give priority to the reduction in the degree of deceleration of the vehicle 100 over the fuel efficiency. In such a case, the operation state of the internal combustion engine 20 may be controlled into the idling state instead of the fuel-cut state. The details of the coasting process may be changed so that an appropriate operation state of the internal combustion engine 20 can be selected.

The details of the coasting process may be set as follows. That is, in step S100, only the first predicted acceleration W1 is calculated out of the first predicted acceleration W1 and the second predicted acceleration W2, and the calculation of the second predicted acceleration W2 is omitted. In this case, the process proceeds to step S200 after step S100. When the first predicted acceleration W1 is within the setting range R in step S200 (step S200: YES), the internal combustion engine 20 is controlled into the fuel-cut state as in the above embodiment (step S130). When the first predicted acceleration W1 is outside the setting range R (step S200: NO), the process proceeds to step S210 and the subsequent step and the feedback control on the acceleration is performed. When the calculation of the second predicted acceleration W2 is omitted as in this modification, it is not essential to set the coasting upper limit value RU. Since the fuel-cut driving force serving as the basis for the first predicted acceleration W1 is a negative value, the first predicted acceleration W1 is basically a negative value as well. It is only necessary to set the lower limit value for coasting in order to avoid excessively sudden deceleration.

Contrary to the above modification, the details of the coasting process may be set as follows. That is, in step S100, only the second predicted acceleration W2 is calculated out of the first predicted acceleration W1 and the second predicted acceleration W2, and the calculation of the first predicted acceleration W1 is omitted. The process proceeds to step S110 after step S100. When the second predicted acceleration W2 is within the setting range R in step S110 (step S110: YES), the process proceeds to step S140 and the internal combustion engine 20 is controlled into the idling state. When the second predicted acceleration W2 is outside the setting range R (step S110: NO), the process proceeds to step S210 and the subsequent step and the feedback control on the acceleration is performed.

The coasting condition is not limited to the example of the above embodiment. For example, the coasting condition may be that the requested acceleration from the application AP is equal to or higher than the coasting lower limit value RD and equal to or lower than the coasting upper limit value RU. The coasting condition may be any condition as long as it can define a situation where deceleration by coasting is requested.

The method for calculating the actual acceleration WQ is not limited to the example of the above embodiment. The method for calculating the actual acceleration WQ is not limited as long as the actual acceleration WQ can be calculated appropriately.

Among the ECUs described in the above embodiment, a specific ECU may also have the function of another ECU. For example, the general ECU 60 may have the functions of the drive system ECU 71 and the brake ECU 72 in addition to the functions of the general ECU 60 itself. Such a configuration may be adopted as long as the same processes as in the above embodiment can be implemented.

Contrary to the above modification, the function of one ECU in the above embodiment may be implemented by a plurality of ECUs. For example, the functions of the general ECU 60 in the above embodiment may be implemented by a plurality of ECUs. In this case, the ECUs collectively constitute the control device for the vehicle 100.

The processing circuit 62 of the general ECU 60 may have any one of the following configurations (a) to (c). The same applies to the processing circuits of the other ECUs such as the command ECU 80.

(a) The processing circuit 62 includes one or more processors that execute various processes based on computer programs. The processor includes a CPU and memories such as a random access memory (RAM) and a read only memory (ROM). The memory stores program codes or commands configured to cause the CPU to execute processes. The memory, that is, a computer-readable medium, includes any available media that can be accessed by a general purpose or special purpose computer.

(b) The processing circuit 62 includes one or more dedicated hardware circuits that execute various processes. Examples of the dedicated hardware circuits include an ASIC and an FPGA. The ASIC is an abbreviation for "application specific integrated circuit" and the FPGA is an abbreviation for "field programmable gate array".

(c) The processing circuit 62 includes a processor that executes a part of various processes based on computer programs, and a dedicated hardware circuit that executes the rest of the various processes.

What is claimed is:

1. A control device for a vehicle, the control device comprising one or more processors configured to:
   calculate a first predicted acceleration that is a predicted acceleration of the vehicle on an assumption that an internal combustion engine mounted on the vehicle is controlled into a fuel-cut state;
   when a coasting condition that is predetermined is satisfied and the first predicted acceleration is equal to or higher than a lower limit value that is predetermined as a negative value, control the internal combustion engine into the fuel-cut state without performing feedback control, wherein the feedback control is a feedback control performed on an acceleration of the vehicle by controlling a driving force of the internal combustion engine based on a difference between a requested acceleration of the vehicle from an application and an actual acceleration of the vehicle; and
   when another condition of the first predicted acceleration is satisfied, perform the feedback control.

2. The control device according to claim 1, wherein the one or more processors are configured to:
   calculate a second predicted acceleration that is a predicted acceleration of the vehicle on an assumption that the internal combustion engine is controlled into an idling state; and
   control the internal combustion engine into the idling state without performing the feedback control when the coasting condition is satisfied, the second predicted acceleration is equal to or higher than the lower limit value and equal to or lower than an upper limit value that is predetermined as a negative value higher than the lower limit value, and the first predicted acceleration is lower than the lower limit value.

3. The control device according to claim 2, wherein the one or more processors are configured to control the internal combustion engine into the fuel-cut state without performing the feedback control when the coasting condition is satisfied and both the first predicted acceleration and the second predicted acceleration are equal to or higher than the lower limit value and equal to or lower than the upper limit value.

4. The control device according to claim 2, wherein the one or more processors are configured to, when the coasting condition is satisfied and both the first predicted acceleration and the second predicted acceleration are higher than the upper limit value:
   calculate a value equal to or higher than the lower limit value and equal to or lower than the upper limit value as a set acceleration that is a new requested acceleration in place of the requested acceleration from the application; and perform the feedback control by controlling a braking force of a brake device mounted on the vehicle in addition to the driving force based on the difference between the set acceleration and the actual acceleration of the vehicle.

5. A control device for a vehicle, the control device comprising one or more processors configured to:
calculate a second predicted acceleration that is a predicted acceleration of the vehicle on an assumption that an internal combustion engine mounted on the vehicle is controlled into an idling state;
when a predetermined coasting condition is satisfied and the second predicted acceleration is equal to or higher than a lower limit value that is predetermined as a negative value and equal to or lower than an upper limit value that is predetermined as a negative value higher than the lower limit value, control the internal combustion engine into the idling state without performing feedback control, wherein the feedback control is a feedback control performed on an acceleration of the vehicle by controlling a driving force of the internal combustion engine based on a difference between a requested acceleration of the vehicle from an application and an actual acceleration of the vehicle; and
when another condition of the second predicted acceleration is satisfied, perform the feedback control.

6. A control method for a vehicle, the control method being executed by a computer mounted on the vehicle, the control method comprising:
calculating a predicted acceleration of the vehicle on an assumption that an internal combustion engine mounted on the vehicle is controlled into a predetermined state, the predetermined state being a fuel-cut state or an idling state;
when a predetermined coasting condition is satisfied and the predicted acceleration is equal to or higher than a lower limit value that is predetermined as a negative value, controlling the internal combustion engine into the predetermined state without performing feedback control, wherein the feedback control is a feedback control performed on an acceleration of the vehicle by controlling a driving force of the internal combustion engine based on a difference between a requested acceleration of the vehicle from an application and an actual acceleration of the vehicle;
when another condition of the predicted acceleration is satisfied, performing the feedback control.

7. The control method according to claim 6, wherein, when the predetermined state is the idling state, the internal combustion engine is controlled into the predetermined state without performing the feedback control when the predetermined coasting condition is satisfied and the predicted acceleration is equal to or higher than the lower limit value and is equal to or lower than an upper limit value that is predetermined as a negative value higher than the lower limit value.

8. A non-transitory computer-readable storage medium storing instructions that are executable by a computer mounted on a vehicle and that cause the computer to execute the control method according to claim 6.

* * * * *